US010635327B2

(12) United States Patent
Helmick et al.

(10) Patent No.: US 10,635,327 B2
(45) Date of Patent: Apr. 28, 2020

(54) DATA AVAILABILITY DURING MEMORY INACCESSIBILITY

(71) Applicant: Western Digital Technologies, Inc., San Jose, CA (US)

(72) Inventors: Daniel Helmick, Broomfield, CO (US); Yuheng Zhang, Atlanta, GA (US); Mai Ghaly, Bloomington, MN (US); Yibo Yin, Sunnyvale, CA (US); Hao Su, Sunnyvale, CA (US); Kent Anderson, Broomfield, CO (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 66 days.

(21) Appl. No.: 15/885,770

(22) Filed: Jan. 31, 2018

(65) Prior Publication Data

US 2019/0235768 A1     Aug. 1, 2019

(51) Int. Cl.
*G06F 3/06* (2006.01)
*G06F 11/10* (2006.01)

(52) U.S. Cl.
CPC .......... *G06F 3/0617* (2013.01); *G06F 3/0619* (2013.01); *G06F 3/0665* (2013.01); *G06F 3/0679* (2013.01); *G06F 11/108* (2013.01); *G06F 11/1012* (2013.01); *G06F 11/1076* (2013.01)

(58) Field of Classification Search
CPC .... G06F 3/0617; G06F 3/0665; G06F 3/0619; G06F 3/0679; G06F 11/1076

USPC .......................................... 714/764; 711/103
See application file for complete search history.

(56) References Cited

U.S. PATENT DOCUMENTS

| | | | |
|---|---|---|---|
| 6,044,445 A * | 3/2000 | Tsuda ................... | G06F 12/1081 711/163 |
| 6,269,453 B1 | 7/2001 | Krantz | |
| 6,757,784 B2 | 6/2004 | Lu et al. | |
| 9,761,297 B1 | 9/2017 | Tomishima | |
| 2004/0083335 A1* | 4/2004 | Gonzalez ............ | G06F 12/0246 711/103 |
| 2012/0198123 A1* | 8/2012 | Post .................... | G06F 11/1435 711/103 |
| 2012/0317352 A1* | 12/2012 | Kang ................ | G11C 11/40611 711/106 |
| 2013/0336047 A1 | 12/2013 | Hokenmaier | |
| 2014/0095786 A1* | 4/2014 | Moon ................. | G11C 11/4078 711/109 |
| 2017/0003914 A1* | 1/2017 | Gschwind ............... | G06F 12/02 |

(Continued)

*Primary Examiner* — James C Kerveros
(74) *Attorney, Agent, or Firm* — Kunzler Bean & Adamson, PC

(57) ABSTRACT

Apparatuses, systems, and methods are disclosed for data availability during temporary inaccessibility of a memory region for memory. An apparatus may include a plurality of memory elements and a controller. A controller may be configured to identify a portion of memory of a plurality of memory elements such that data stored in a portion of memory is temporarily inaccessible and other data stored in other portions of memory in the plurality of memory elements is accessible. A controller may be configured to reconstruct data stored in a portion of memory from other data stored in other portions of memory. A controller may be configured to provide reconstructed data while a portion of an array is temporarily inaccessible.

16 Claims, 10 Drawing Sheets

(56) References Cited

U.S. PATENT DOCUMENTS

2017/0102993 A1 4/2017 Hu et al.
2017/0110178 A1 4/2017 Bains

* cited by examiner

US 10,635,327 B2

DATA AVAILABILITY DURING MEMORY INACCESSIBILITY

TECHNICAL FIELD

The present disclosure, in various embodiments, relates to memory and more particularly relates to data availability during temporary inaccessibility of a memory region.

BACKGROUND

Various types of memory devices store data in two-dimensional or three-dimensional arrays of memory cells. At times, stored data may become temporarily inaccessible for a variety of reasons. For example, data may become temporarily inaccessible when performing background maintenance activities, becoming inaccessible due to an operating error, and the like. One example of temporary inaccessibility due to a background media activity may be the periodic refreshing of information stored on the memory device. Other background media activities that may also cause temporary inaccessibility may include mediated degradation, media age check, media bit error rate check, media retention check, data migration, or the like. When performing these maintenance and other background activities, the data associated with the activity may become temporarily off-line.

SUMMARY

Apparatuses are presented for data availability during temporary inaccessibility of a memory region for memory. An apparatus, in one embodiment, includes a plurality of memory elements and a controller. A controller, in one embodiment, is configured to identify a portion of memory of a plurality of memory elements such that data stored in a portion of memory is temporarily inaccessible and other data stored in other portions of memory in the plurality of memory elements is accessible. In a certain embodiment, a controller is configured to reconstruct data stored in a portion of memory from other data stored in other portions of memory. In a further embodiment, a controller is configured to provide reconstructed data while a portion of an array is temporarily inaccessible.

Methods are presented for data availability during temporary inaccessibility of a memory region for memory. In one embodiment, a method includes identifying a temporarily inaccessible portion of memory of a plurality of memory elements. In a certain embodiment, a method includes restricting other data stored in other portions of memory in a plurality of memory elements from becoming inaccessible. In an additional embodiment, a method includes reconstructing data from a temporarily inaccessible portion of memory based in other data stored in other portions of memory. In a further embodiment, a method includes providing reconstructed data while a portion of memory is temporarily inaccessible.

An apparatus, in another embodiment, includes means for detecting, in response to a read request for a plurality of memory elements, that a portion of memory of the plurality of memory elements is temporarily inaccessible. In a certain embodiment, an apparatus includes means for temporarily limiting other portions of memory of a plurality of memory elements from becoming inaccessible. In an additional embodiment, an apparatus includes means for reconstructing temporarily inaccessible data of a portion of memory by correcting errors in other portions of memory and reconstructing temporarily inaccessible data from accessible data stored in the other portions of memory. In a further embodiment, an apparatus includes means for providing reconstructed temporarily inaccessible data in response to a read request.

BRIEF DESCRIPTION OF THE DRAWINGS

A more particular description is included below with reference to specific embodiments illustrated in the appended drawings. Understanding that these drawings depict only certain embodiments of the disclosure and are not therefore to be considered limiting of the scope of the disclosure, the disclosure is described and explained with additional specificity and detail through the use of the accompanying drawings, in which.

DETAILED DESCRIPTION

Figure 1:
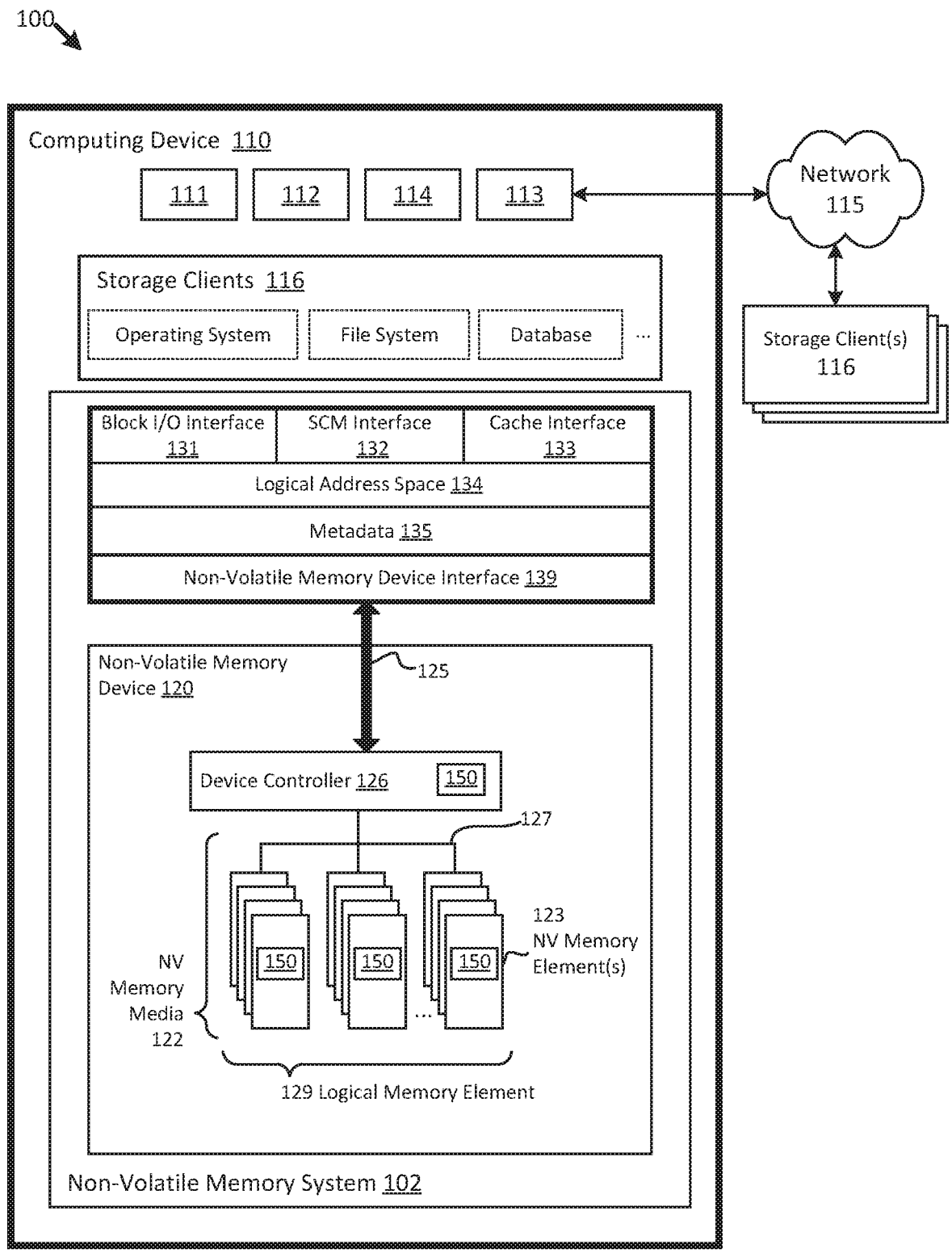
FIG. 1 is a schematic block diagram illustrating one embodiment of a system comprising non-volatile memory elements.

Aspects of the present disclosure may be embodied as an apparatus, system, method, or computer program product. Accordingly, aspects of the present disclosure may take the form of an entirely hardware embodiment, an entirely software embodiment (including firmware, resident software, micro-code, or the like) or an embodiment combining software and hardware aspects that may all generally be referred to herein as a "circuit," "module," "apparatus," or "system." Furthermore, aspects of the present disclosure may take the form of a computer program product embodied in one or more non-transitory computer readable storage media storing computer readable and/or executable program code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented at least partially in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may include a single instruction, or many instructions, and may even be distributed over several different code segments, among different programs, across several memory devices, or the like. Where a module or portions of a module are implemented in software, the software portions may be stored on one or more computer readable and/or executable storage media. Any combination of one or more computer readable storage media may be utilized. A computer readable storage medium may include, for example, but not limited to, an electronic, magnetic, optical, electromagnetic, infrared, or semiconductor system, apparatus, or device, or any suitable combination of the foregoing, but would not include propagating signals. In the context of this document, a computer readable and/or executable storage medium may be any tangible and/or non-transitory medium that may contain or store a program for use by or in connection with an instruction execution system, apparatus, processor, or device.

Computer program code for carrying out operations for aspects of the present disclosure may be written in any combination of one or more programming languages, including an object oriented programming language such as Python, Java, Smalltalk, C++, C#, Objective C, or the like, conventional procedural programming languages, such as the "C" programming language, scripting programming languages, and/or other similar programming languages. The program code may execute partly or entirely on one or more of a user's computer and/or on a remote computer or server over a data network or the like.

A component, as used herein, comprises a tangible, physical, non-transitory device. For example, a component may be implemented as a hardware logic circuit comprising custom VLSI circuits, gate arrays, or other integrated circuits; off-the-shelf semiconductors such as logic chips, transistors, or other discrete devices; and/or other mechanical or electrical devices. A component may also be implemented in programmable hardware devices such as field programmable gate arrays, programmable array logic, programmable logic devices, or the like. A component may comprise one or more silicon integrated circuit devices (e.g., chips, die, die planes, packages) or other discrete electrical devices, in electrical communication with one or more other components through electrical lines of a printed circuit board (PCB) or the like. Each of the modules described herein, in certain embodiments, may alternatively be embodied by or implemented as a component.

A circuit, as used herein, comprises a set of one or more electrical and/or electronic components providing one or more pathways for electrical current. In certain embodiments, a circuit may include a return pathway for electrical current, so that the circuit is a closed loop. In another embodiment, however, a set of components that does not include a return pathway for electrical current may be referred to as a circuit (e.g., an open loop). For example, an integrated circuit may be referred to as a circuit regardless of whether the integrated circuit is coupled to ground (as a return pathway for electrical current) or not. In various embodiments, a circuit may include a portion of an integrated circuit, an integrated circuit, a set of integrated circuits, a set of non-integrated electrical and/or electrical components with or without integrated circuit devices, or the like. In one embodiment, a circuit may include custom VLSI circuits, gate arrays, logic circuits, or other integrated circuits; off-the-shelf semiconductors such as logic chips, transistors, or other discrete devices; and/or other mechanical or electrical devices. A circuit may also be implemented as a synthesized circuit in a programmable hardware device such as field programmable gate array, programmable array logic, programmable logic device, or the like (e.g., as firmware, a netlist, or the like). A circuit may comprise one or more silicon integrated circuit devices (e.g., chips, die, die planes, packages) or other discrete electrical devices, in electrical communication with one or more other components through electrical lines of a printed circuit board (PCB) or the like. Each of the modules described herein, in certain embodiments, may be embodied by or implemented as a circuit.

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

In the following detailed description, reference is made to the accompanying drawings, which form a part thereof. The foregoing summary is illustrative only and is not intended to be in any way limiting. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

FIG. 1 is a block diagram of one embodiment of a system 100 comprising one or more data availability components 150 for a non-volatile memory device 120. Data availability components 150 may be part of one or more non-volatile memory elements 123, a device controller 126 external to the non-volatile memory elements 123, a device driver, or the like. Data availability components 150 may be part of a non-volatile memory system 102 of a computing device 110, which may comprise a processor 111, volatile memory 112 (e.g., dynamic random access memory (DRAM), static random access memory (SRAM), and/or other volatile memory), a communication interface 113, or the like. The processor 111 may comprise one or more central processing units, one or more general-purpose processors, one or more application-specific processors, one or more virtual processors (e.g., the computing device 110 may be a virtual machine operating within a host), one or more processor cores, or the like. The communication interface 113 may comprise one or more network interfaces configured to communicatively couple the computing device 110 and/or device controller 126 to a communication network 115, such as an Internet Protocol (IP) network, a Storage Area Network (SAN), wireless network, wired network, or the like.

The non-volatile memory device 120, in various embodiments, may be disposed in one or more different locations relative to the computing device 110. In one embodiment, the non-volatile memory device 120 comprises one or more non-volatile memory elements 123, such as semiconductor chips or packages or other integrated circuit devices disposed on one or more printed circuit boards, storage housings, and/or other mechanical and/or electrical support structures. For example, the non-volatile memory device 120 may comprise one or more direct inline memory module (DIMM) cards, one or more expansion cards and/or daughter cards, a solid-state-drive (SSD) or other hard drive device, and/or may have another memory and/or storage form factor. The non-volatile memory device 120 may be integrated with and/or mounted on a motherboard of the computing device 110, installed in a port and/or slot of the computing device 110, installed on a different computing device 110 and/or a dedicated storage appliance on the network 115, in communication with the computing device 110 over an external bus (e.g., an external hard drive), or the like.

The non-volatile memory device 120, in one embodiment, may be disposed on a memory bus of a processor 111 (e.g., on the same memory bus as the volatile memory 112, on a different memory bus from the volatile memory 112, in place of the volatile memory 112, or the like). In a further embodiment, the non-volatile memory device 120 may be disposed on a peripheral bus of the computing device 110, such as a peripheral component interconnect express (PCI Express or PCIe) bus, a serial Advanced Technology Attachment (SATA) bus, a parallel Advanced Technology Attachment (PATA) bus, a small computer system interface (SCSI) bus, a FireWire bus, a Fibre Channel connection, a Universal Serial Bus (USB), a PCIe Advanced Switching (PCIe-AS) bus, or the like. In another embodiment, the non-volatile memory device 120 may be disposed on a data network 115, such as an Ethernet network, an Infiniband network, SCSI RDMA over a network 115, a storage area network (SAN), a local area network (LAN), a wide area network (WAN) such as the Internet, another wired and/or wireless network 115, or the like.

The computing device 110 may further comprise a non-transitory, computer readable storage medium 114. The computer readable storage medium 114 may comprise executable instructions configured to cause the computing device 110 (e.g., processor 111) to perform steps of one or more of the methods disclosed herein.

The non-volatile memory system 102, in the depicted embodiment, includes one or more data availability components 150. A data availability component 150, in one embodiment, may be configured to identify a portion of memory, in the non-volatile memory device 120 and/or in the volatile memory 112, such that data stored in the portion of memory is inaccessible and data stored in other portions of memory is accessible, reconstruct the data stored in the portion of memory from the data stored in the other portions of memory, and provide the reconstructed data while the portion of memory is temporarily inaccessible. In certain types of memory, background media activity may cause data stored in the memory to become inaccessible while the background activity occurs. By reconstructing the data based on the other portions of memory, a data availability component 150 may be able to provide the reconstructed data while the portion of memory containing the data is inaccessible. Data availability components 150 are described in greater detail below with regard to FIGS. 2-11C.

In one embodiment, a data availability component 150 may include logic hardware of one or more non-volatile memory devices 120, such as a device controller 126, a non-volatile memory element 123, other programmable logic, firmware for a non-volatile memory element 123, microcode for execution by a non-volatile memory element 123, or the like. In another embodiment, a data availability component 150 may include executable software code, stored on a computer readable storage medium for execution by logic hardware of a non-volatile memory element 123. In a further embodiment, a data availability component 150 may include a combination of both executable software code and logic hardware.

In one embodiment, the non-volatile memory device 120 is configured to receive storage requests from a device driver or other executable application via buses 125, 127, a device controller 126, or the like. The non-volatile memory device 120 may be further configured to transfer data to/from a device driver and/or storage clients 116 via the bus 125. Accordingly, the non-volatile memory device 120, in some embodiments, may comprise and/or be in communication with one or more direct memory access (DMA) modules, remote DMA modules, bus controllers, bridges, buffers, and so on to facilitate the transfer of storage requests and associated data. In another embodiment, the non-volatile memory device 120 may receive storage requests as an API call from a storage client 116, as an IO-CTL command, or the like.

According to various embodiments, a device controller 126 may manage one or more non-volatile memory devices 120 and/or non-volatile memory elements 123. The non-volatile memory device(s) 120 may comprise recording, memory, and/or storage devices, such as solid-state storage device(s) and/or semiconductor storage device(s) that are arranged and/or partitioned into a plurality of addressable media storage locations. As used herein, a media storage location refers to any physical unit of memory (e.g., any quantity of physical storage media on a non-volatile memory device 120). Memory units may include, but are not limited to: pages, memory divisions, blocks, sectors, collections or sets of physical storage locations (e.g., logical pages, logical blocks), or the like.

A device driver and/or the device controller 126, in certain embodiments, may present a logical address space 134 to the storage clients 116. As used herein, a logical address space 134 refers to a logical representation of memory resources. The logical address space 134 may comprise a plurality (e.g., range) of logical addresses. As used herein, a logical address refers to any identifier for referencing a memory resource (e.g., data), including, but not limited to: a logical block address (LBA), cylinder/head/sector (CHS) address, a file name, an object identifier, an inode, a Universally Unique Identifier (UUID), a Globally Unique Identifier (GUID), a hash code, a signature, an index entry, a range, an extent, or the like.

A device driver for the non-volatile memory device 120 may maintain metadata 135, such as a logical to physical address mapping structure, to map logical addresses of the logical address space 134 to media storage locations on the non-volatile memory device(s) 120. A device driver may be configured to provide storage services to one or more storage clients 116. The storage clients 116 may include local storage clients 116 operating on the computing device 110 and/or remote, storage clients 116 accessible via the network 115 and/or communication interface 113. The storage clients 116 may include, but are not limited to: operating systems, file systems, database applications, server applications, kernel-level processes, user-level processes, applications, and the like.

A device driver may be communicatively coupled to one or more non-volatile memory devices 120. The one or more non-volatile memory devices 120 may include different types of non-volatile memory devices including, but not limited to: solid-state storage devices, semiconductor storage devices, SAN storage resources, or the like. The one or more non-volatile memory devices 120 may comprise one or more respective device controllers 126 and non-volatile memory media 122. A device driver may provide access to the one or more non-volatile memory devices 120 via a traditional block I/O interface 131. Additionally, a device driver may provide access to enhanced functionality through the SCM interface 132. The metadata 135 may be used to manage and/or track data operations performed through any of the block I/O interface 131, SCM interface 132, cache interface 133, or other, related interfaces.

The cache interface 133 may expose cache-specific features accessible via a device driver for the non-volatile memory device 120. Also, in some embodiments, the SCM interface 132 presented to the storage clients 116 provides access to data transformations implemented by the one or more non-volatile memory devices 120 and/or the one or more device controllers 126.

A device driver may present a logical address space 134 to the storage clients 116 through one or more interfaces. As discussed above, the logical address space 134 may comprise a plurality of logical addresses, each corresponding to respective media locations the on one or more non-volatile memory devices 120. A device driver may maintain metadata 135 comprising any-to-any mappings between logical addresses and media locations, or the like.

A device driver may further comprise and/or be in communication with a non-volatile memory device interface 139 configured to transfer data, commands, and/or queries to the one or more non-volatile memory devices 120 over a bus 125, which may include, but is not limited to: a memory bus of a processor 111, a peripheral component interconnect express (PCI Express or PCIe) bus, a serial Advanced Technology Attachment (ATA) bus, a parallel ATA bus, a small computer system interface (SCSI), FireWire, Fibre Channel, a Universal Serial Bus (USB), a PCIe Advanced Switching (PCIe-AS) bus, a network 115, Infiniband, SCSI RDMA, or the like. The non-volatile memory device interface 139 may communicate with the one or more non-volatile memory devices 120 using input-output control (IO-CTL) command(s), IO-CTL command extension(s), remote direct memory access, or the like.

The communication interface 113 may comprise one or more network interfaces configured to communicatively couple the computing device 110 and/or the device controller 126 to a network 115 and/or to one or more remote, network-accessible storage clients 116. The storage clients 116 may include local storage clients 116 operating on the computing device 110 and/or remote, storage clients 116 accessible via the network 115 and/or the communication interface 113. The device controller 126 is part of and/or in communication with one or more non-volatile memory devices 120. Although FIG. 1 depicts a single non-volatile memory device 120, the disclosure is not limited in this regard and could be adapted to incorporate any number of non-volatile memory devices 120.

The non-volatile memory device 120 may comprise one or more elements 123 of non-volatile memory media 122, which may include but is not limited to: resistive random access memory (ReRAM), Memristor memory, phase-change memory (PCM, PCME, PRAM, PCRAM, ovonic unified memory, chalcogenide RAM, or C-RAM), NAND flash memory (e.g., 2D NAND flash memory, 3D NAND flash memory), NOR flash memory, nano random access memory (nano RAM or NRAM), nanocrystal wire-based memory, silicon-oxide based sub-10 nanometer process memory, graphene memory, Silicon-Oxide-Nitride-Oxide-Silicon (SONOS), programmable metallization cell (PMC), conductive-bridging RAM (CBRAM), magneto-resistive RAM (MRAM), magnetic storage media (e.g., hard disk, tape), optical storage media, or the like. The one or more elements 123 of non-volatile memory media 122, in certain embodiments, comprise storage class memory (SCM).

While legacy technologies such as NAND flash may be block and/or page addressable, storage class memory, in one embodiment, is byte addressable. In further embodiments, storage class memory may be faster and/or have a longer life (e.g., endurance) than NAND flash; may have a lower cost, use less power, and/or have a higher storage density than DRAM; or offer one or more other benefits or improvements when compared to other technologies. For example, storage class memory may comprise one or more non-volatile memory elements 123 of ReRAM, Memristor memory, programmable metallization cell memory, phase-change memory (PCM), nano RAM, nanocrystal wire-based memory, silicon-oxide based sub-10 nanometer process memory, graphene memory, SONOS memory, PMC memory, CBRAM, MRAM, and/or variations thereof.

While the non-volatile memory media 122 is referred to herein as "memory media," in various embodiments, the non-volatile memory media 122 may more generally comprise one or more non-volatile recording media capable of recording data, which may be referred to as a non-volatile memory medium, a non-volatile storage medium, or the like. Further, the non-volatile memory device 120, in various embodiments, may comprise a non-volatile recording device, a non-volatile memory device, a non-volatile storage device, or the like. Similarly, a non-volatile memory element 123, in various embodiments, may comprise a non-volatile recording element, a non-volatile memory element, a non-volatile storage element, or the like.

The non-volatile memory media 122 may comprise one or more non-volatile memory elements 123, which may include, but are not limited to: chips, packages, planes, die, or the like. A device controller 126, external to the one or more non-volatile memory elements 123, may be configured to manage data operations on the non-volatile memory media 122, and may comprise one or more processors, programmable processors (e.g., FPGAs), ASICs, microcontrollers, or the like. In some embodiments, the device controller 126 is configured to store data on and/or read data from the non-volatile memory media 122, to transfer data to/from the non-volatile memory device 120, and so on.

The device controller 126 may be communicatively coupled to the non-volatile memory media 122 by way of a bus 127. The bus 127 may comprise an I/O bus for communicating data to/from the non-volatile memory elements 123. The bus 127 may further comprise a control bus for communicating addressing and other command and control information to the non-volatile memory elements 123. In some embodiments, the bus 127 may communicatively couple the non-volatile memory elements 123 to the device controller 126 in parallel. This parallel access may allow the non-volatile memory elements 123 to be managed as a group, forming a logical memory element 129. The logical memory element may be partitioned into respective logical memory units (e.g., logical pages) and/or logical memory divisions (e.g., logical blocks). The logical memory units may be formed by logically combining physical memory units of each of the non-volatile memory elements.

The device controller 126 may comprise and/or be in communication with a device driver executing on the computing device 110. A device driver may provide storage services to the storage clients 116 via one or more interfaces 131, 132, and/or 133. In some embodiments, a device driver provides a block-device I/O interface 131 through which storage clients 116 perform block-level I/O operations. Alternatively, or in addition, a device driver may provide a storage class memory (SCM) interface 132, which may provide other storage services to the storage clients 116. In some embodiments, the SCM interface 132 may comprise extensions to the block device interface 131 (e.g., storage clients 116 may access the SCM interface 132 through extensions or additions to the block device interface 131). Alternatively, or in addition, the SCM interface 132 may be provided as a separate API, service, and/or library. A device driver may be further configured to provide a cache interface 133 for caching data using the non-volatile memory system 102.

A device driver may further comprise a non-volatile memory device interface 139 that is configured to transfer data, commands, and/or queries to the device controller 126 over a bus 125, as described above.

Figure 2:
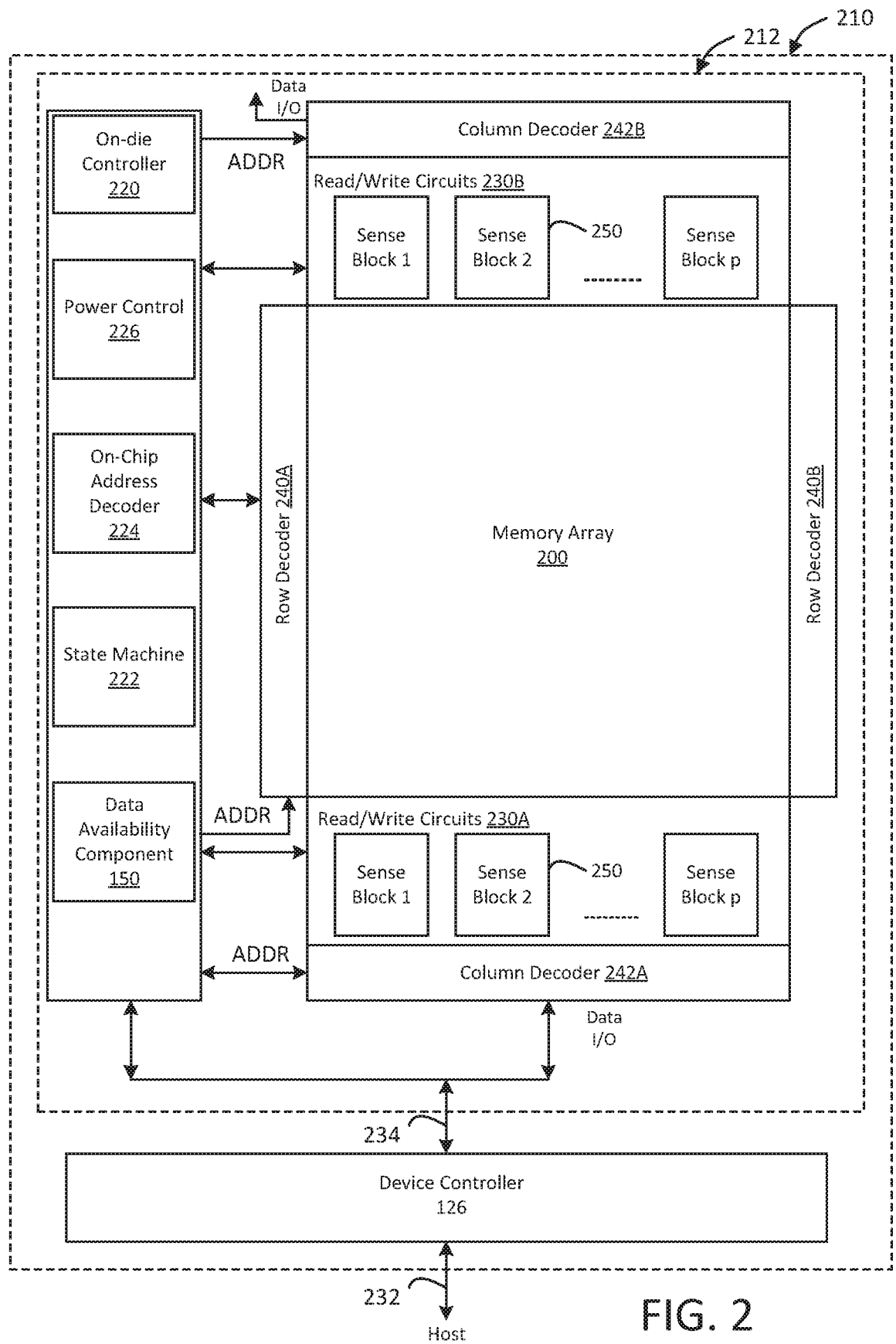
FIG. 2 is a schematic block diagram illustrating another embodiment of a system comprising non-volatile memory elements.

FIG. 2 illustrates an embodiment of a non-volatile storage device 210 that may include one or more memory die or chips 212. A memory die or chip 212 may be a non-volatile memory element 123 as described above with regard to FIG. 1. The non-volatile storage device 210 may be substantially similar to the nonvolatile memory device 120 described with reference to FIG. 1. Memory die 212, in some embodiments, includes an array (two-dimensional or three-dimensional) of memory cells 200, an on-die controller 220, and read/write circuits 230A/230B. In one embodiment, access to the memory array 200 by the various peripheral circuits is implemented in a symmetric fashion, on opposite sides of the array, so that the densities of access lines and circuitry on each side are reduced by half. The read/write circuits 230A/230B, in a further embodiment, include multiple sense blocks 250 which allow a page of memory cells to be read or programmed in parallel. In the depicted embodiment, peripheral circuits such as row decoders 240A/240B, column decoders 242A/242B, and read/write circuits 230A/230B are disposed at the edges of the memory array. In another embodiment, however, peripheral circuitry may be disposed above, below, and/or at the sides of a three-dimensional memory array 200.

The memory array 200, in various embodiments, is addressable by word lines via row decoders 240A/240B and by bit lines via column decoders 242A/242B. In some embodiments, a device controller 126 external to the memory die 212 is included in the same memory device 210 (e.g., a removable storage card or package) as the one or more memory die 212. Commands and data are transferred between the host and the device controller 126 via lines 232 and between the device controller 126 and the one or more memory die 212 via lines 234. One implementation can include multiple chips 212.

On-die controller 220, in one embodiment, cooperates with the read/write circuits 230A/230B to perform memory operations on the memory array 200. The on-die controller 220, in certain embodiments, includes a state machine 222, an on-chip address decoder 224, a power control circuit 226, and a data availability component 150, which may be substantially as described above with regard to FIG. 1. In various embodiments, a data availability component 150 may include or be embodied by an on-die controller 220, a state machine 222, a device controller 126, and/or a device driver.

The state machine 222, in one embodiment, provides chip-level control of memory operations. The on-chip address decoder 224 provides an address interface to convert between the address that is used by the host or a device controller 126 to the hardware address used by the decoders 240A, 240B, 242A, 242B. The power control circuit 226 controls the power and voltages supplied to the word lines and bit lines during memory operations. In one embodiment, power control circuit 226 includes one or more charge pumps that can create voltages larger than the supply voltage.

In one embodiment, one or any combination of on-die controller 220, power control circuit 226, on-chip address decoder 224, state machine 222, data availability component 150, decoder circuit 242A, decoder circuit 242B, decoder circuit 240A, decoder circuit 240B, read/write circuits 230A, read/write circuits 230B, and/or device controller 126 can be referred to as one or more managing circuits.

Figure 3A:
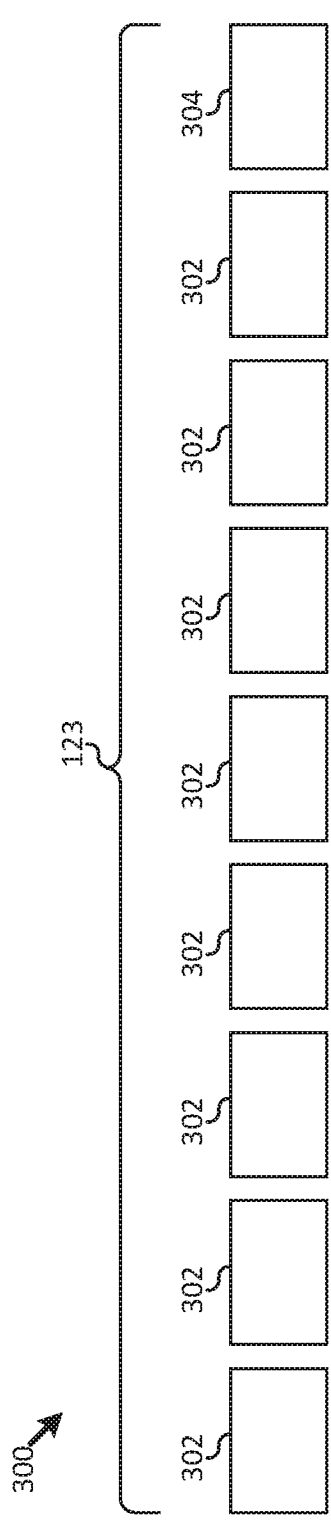
FIGS. 3A-3B are block diagrams illustrating one embodiment for data saved on multiple non-volatile memory elements.

FIG. 3A is a block diagram illustrating a memory 300 where data is saved on multiple non-volatile memory elements 123, in a volatile memory 112, or the like including data elements 302 and data reconstruction elements 304. While a non-volatile memory element 123 is depicted in FIG. 3A by way of example, in other embodiments, the memory 300 may comprise a volatile memory element 112 (e.g., DRAM, SRAM, or the like). As described above with respect to non-volatile memory elements 123 and/or the volatile memory 112 in FIG. 1, a memory element may be a semiconductor chip, package, or other integrated circuit device disposed on a printed circuit board, storage housing, and/or other mechanical and/or electrical support structure. As illustrated, the elements 302 in memory 300 may store user data. Further, the memory 300 may include a data reconstruction element 304. For example, the data reconstruction element 304 may store data that can be combined with data stored on the elements 302 to reconstruct data stored on a single element in the elements 302. For example, the data reconstruction element 304 may store parity data, which, as used herein, may refer to data that can be combined with stored data to reconstruct data for an element 302. As used herein, reconstructing data may refer to using available data to reproduce inaccessible data. In certain implementations, the parity data stored on the data reconstruction element 304 may be combined with data on the elements 302 through a Boolean XOR function to reconstruct data missing from one of the elements 302. Data reconstruction element 304 may also store other information that may be used to reconstruct data in the elements 302.

Figure 3B:
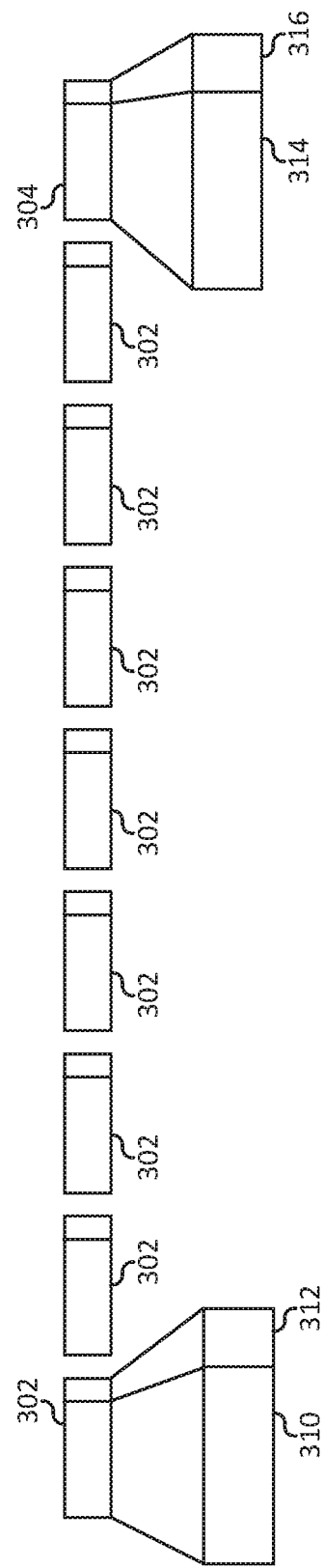

In certain embodiments, the memory 300 of both an element 302 and a data reconstruction element 304 may be segmented into different sections as illustrated in FIG. 3B. In at least one implementation, the segments of an element 302 may be divided into a first section 310 and a second section 312. For example, the first section 310 may store data that can be used by a computation system and the second section 312 may store error correction information that can be used by an error correcting code (ECC) to correct errors in the first section 310. In a similar manner, the segments of the element 304 may be likewise divided into a first section 314 and a second section 316, where the first section 314 of the data reconstruction element 304 may store data that can be used to reconstruct a first section 310 of one of the elements 302. Similarly, the second section 316 of the data reconstruction element 304 may store data that can be used to reconstruct a second section 312 of one of the elements 302.

In at least one embodiment, the error correction information used by an ECC decoder to correct errors in a first section 310 (also referred to as ECC data) may refer to redundant and/or encoded bits generated by an encoder for an error correcting code. In various embodiments, an error correcting code may be one of various types of error correcting codes, such as a block code, a convolution code, a Bose-Chaudhuri-Hocquenghem (BCH) code, a low-density parity check (LDPC) code, a Hamming code, a Reed-Solomon code, a turbo code, or the like. In a certain embodiment, the error correcting code may be a systematic error correcting code, so that each ECC chunk, or code word, may store data received by an encoder for the error correcting code, as well as parity bits, or check bits.

In certain embodiments, the ECC data in the second section 312 may include an error detection code (EDC) included with or instead of the data used for ECC. Alternatively, there may be a further portion of the element 302 dedicated for storing an error detection code (EDC). As used herein, an EDC may be used to detect errors in the data stored in the first section 310. The EDC may include a sentinel value, a logical address, a cyclical redundancy code (CRC), and/or other ECC miscorrection check that may be performed following or otherwise in association with an ECC decode. The miscorrection check performed using the EDC may detect if the ECC corrected the data in the first section 310 incorrectly (e.g., to an invalid result). In certain embodiments, there may be instances that use an EDC without an ECC to detect for failures, where the miscorrection check may provide a result indicating that there are errors when errors exist in the first portion 310, or the like, without the capability to correct the errors. For simplicity, in the example embodiment depicted in FIG. 3A, the ECC and EDC are grouped together.

In certain embodiments, such as the embodiment described above, a controller may use data stored in the data reconstruction element 304 by using a Boolean XOR function to reconstruct data on the elements 302. While a XOR function is described, a controller may use the data stored on the data reconstruction element 304 to reconstruct data on the elements 302 in one or more different ways. A controller may use various additional forms of redundant data to reconstruct data of an element 302 that would be clear in view of this disclosure. A controller may also use data stored on the data reconstruction element 304 to algorithmically reconstruct data on the elements 302.

In at least one embodiment, a controller, such as device controller 126 or on-die controller 220 may cause an element in the elements 302 to become temporarily inaccessible. In certain embodiments, the controller may perform background activities to preserve the data stored on a particular element 302 or perform maintenance that services the element 302. For example, in certain memory types (such as PCM, DRAM, among others), a controller may periodically refresh data stored on an element 302 by re-writing the data to the portion of memory being refreshed. In a further embodiment, a background activity may also include a program, a read, an erase, a settings access, or other activity that may cause an element 302 to become temporarily inaccessible. As used herein, an element or data stored on an element becomes inaccessible when a controller, or other device, is unable to read data from or write data to the element. Conversely, an element is accessible when a controller, or other device, is able to read data from or write data to the element. When an element becomes inaccessible, a controller may identify that the element is inaccessible. The controller may identify that an element is inaccessible by directing an element to begin a background media activity associated with inaccessibility. Also, the controller may identify that an element is inaccessible by determining that an unsuccessful attempt to access data stored on the element has occurred.

In certain embodiments, when an element 302 becomes temporarily inaccessible, the computing system may attempt to access data stored on the element 302. For example, a computing system may attempt to read data from or write data to the element 302. If the computing system attempts to read data from the element 302 that is temporarily inaccessible, a controller may use the data stored on the accessible elements in elements 302 along with data stored on the data reconstruction element 304 to reconstruct and provide the temporarily inaccessible data stored on the inaccessible element 302.

Figure 4:
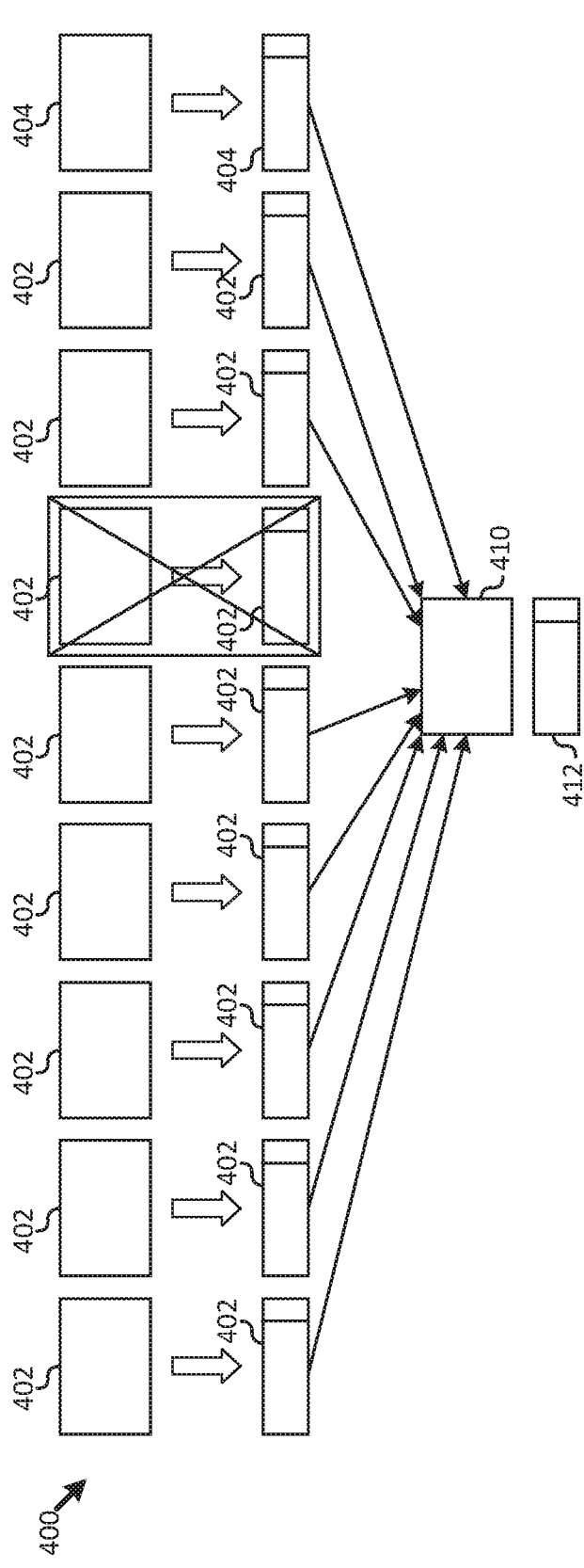
FIG. 4 is a block diagram illustrating one embodiment for reconstructing data for a non-volatile memory element that is temporarily inaccessible.

FIG. 4 illustrates different memory elements that are used to reconstruct data for a temporarily inaccessible memory element. As used herein, a memory element may be a portion of memory, where a portion of memory may be a subdivision of memory in an array of memory. As shown in FIG. 4, the memory 400 includes multiple memory elements 402 and a data reconstruction element 404. The memory elements 402 are similar to the memory elements 302 discussed above in relation to FIG. 3A. Likewise, the data reconstruction element 404 is similar to the memory element 304 discussed above in relation to FIG. 3A. Also, the memory elements 402 and the data reconstruction element 404 may be similarly segmented as described with relation to FIG. 3B. As illustrated in FIG. 4, one element may be temporarily inaccessible. To reconstruct the data stored on the temporarily inaccessible element, a controller may restrict the other elements 402 and the data reconstruction element 404 from becoming inaccessible. The other elements 402 and the data reconstruction element 404 are restricted from becoming inaccessible such that the controller can use the information on the data reconstruction element 404 and the other elements 402 to reconstruct temporarily inaccessible data as reconstructed data 410, where the reconstructed data 410 includes reconstructed user data 412 and reconstructed data for use with an error correcting code 414.

In certain embodiments, the elements 402 may be separate die. When each element in the elements 402 is a separate die, a controller may allow one element in the elements 402 to become temporarily inaccessible. While one element is temporarily inaccessible, the controller may restrict or temporarily limit data stored in other elements 402 from becoming inaccessible. For example, if a die is refreshed, resulting in the die becoming temporarily inaccessible, a controller may limit other die from refreshing or becoming otherwise inaccessible. While the die that is inaccessible is being refreshed, data stored on a die containing data reconstruction information may be combined with data stored on the die that are limited from becoming inaccessible. Further, the data stored on the die containing data reconstruction information may be combined with the data stored on the die that are restricted from becoming inaccessible if a die is rebooted.

In at least one embodiment, to temporarily limit other elements 402 from becoming inaccessible when an element 402 is inaccessible, a controller may restrict the elements 402 such that data on a single element may refresh at a time. For example, when an element 402 is refreshing, the controller may limit the scheduling of refreshes of other elements 402 while the element 402 is refreshing. Alternatively, when an element 402 is refreshing, the controller may wait until the data on the element 402 becomes available before scheduling refreshes for other elements 402. In a further embodiment, where an element 402 is capable of refreshing data stored thereon without being directed by a controller, the element 402 may request approval from the controller before refreshing. Alternatively, an element 402 may communicate with other elements 402 to verify that no other elements 402 are refreshing before refreshing itself. In yet another embodiment, a flag may be associated with the elements 402, where the flag indicates whether or not an element 402 is refreshing.

In a further embodiment, an element 402 in the multiple elements 402 may include multiple die on a channel. When an element 402 is a channel, a controller may instruct all the die on the channel to refresh at the same time or become otherwise temporarily inaccessible. When a channel becomes inaccessible, a controller may communicate to the die on other accessible channels that a channel is currently inaccessible. Either the controller or the accessible die may wait until they receive an indication that the inaccessible channel has become accessible before being allowed to become inaccessible. Further, a channel may include elements that store data reconstruction information that can be combined with data stored in other channels to reconstruct the information stored on the die associated with the channel that is temporarily inaccessible.

In another embodiment, an element 402 may be a subgroup of die where the die are associated with separate channels. For example, die within a channel may be numbered for identification purposes. A controller may direct die on separate channels having the same enumeration to become temporarily inaccessible. For instance, all die having an odd enumeration may be directed to refresh at the same time. As such, the die having an odd enumeration on different channels may become temporarily inaccessible at the same time. When the oddly enumerated die are inaccessible, a controller may restrict die having an even enumeration from refreshing or from becoming otherwise temporarily inaccessible. For example, a controller may direct the die having an even enumeration to avoid refreshing until instructed by the controller. Alternatively, an evenly enumerated die may determine whether an associated oddly enumerated die is inaccessible, if the oddly enumerated die is inaccessible the evenly enumerated die may be restricted from refreshing. Conversely, if the oddly enumerated die is accessible the evenly enumerated die may refresh.

In an alternative embodiment, an element 402 may be a package of die in a memory array having multiple packages. For example, a controller may direct all the die in a package to refresh together or become otherwise temporarily inaccessible at the same time. When all the die in a package become temporarily inaccessible at the same time, the controller may restrict die in other packages from becoming temporarily inaccessible. For example, a controller may communicate with multiple packages and limit data stored on die in the packages from refreshing when data associated with die in a package refreshes. Alternatively, the controller may direct the first die (or other corresponding die) in multiple packages to refresh together or become otherwise temporarily inaccessible. When the first die in the multiple packages become temporarily inaccessible, the controller may restrict the other die in the packages from becoming temporarily inaccessible. For example, a controller may communicate with multiple packages and coordinate which die in multiple packages are allowed to refresh when data associated with a particular grouping of die in multiple package is refreshes.

In a further embodiment, a memory element 402 may correspond to a plane containing multiple memory cells. A controller may cause the plane of memory cells to become temporarily inaccessible. For example, the controller may perform age identification on a per plane basis, which may cause a plane to become inaccessible for a period of time. When the plane is inaccessible, the controller may restrict other planes from becoming inaccessible. For example, a controller may limit data stored on planes of memory from refreshing when data stored on a plane of memory refreshes. Further, the controller may reconstruct the data on the inaccessible plane using the accessible data stored on the planes that are also accessible.

In certain embodiments, memory element 402 may be a partition in the memory array having multiple partitions. A controller may cause the partition to become temporarily inaccessible, for example, the controller may cause wear leveling movements to be done per plane. The performance of the wear leveling movements may cause a partition to become inaccessible. When the partition is inaccessible, the controller may restrict other partitions from becoming inaccessible. For example, a controller may limit data stored within multiple partitions from refreshing when data stored on a partition refreshes. Further, the controller may reconstruct the data on the inaccessible partition using the accessible data stored on the accessible partitions.

In another embodiment, the memory element 402 may be a portion of memory within memory stored on a die. For example, a controller may select a portion of memory stored on a die, where the portion of memory is smaller than the total memory stored on the die. For example, the controller may select a portion of memory equal to a maximum concurrent refresh size for the memory element 402. Alternatively, the controller may select a portion of memory equal to any desired size for the memory elements 402. When the portion of memory is inaccessible, the controller may restrict other portions of memory from becoming inaccessible. Further, the controller may reconstruct the data for the portion of memory from other portions of memory on the die. Alternatively, the controller may reconstruct the data for the portion of memory and the die containing the portion of memory from the memory stored in other memory elements 402.

In an additional embodiment, the memory element 402 may be a grouped sub-range across different partitions in a portion of the memory. For example, a controller may select an address range of memory stored for a partition, where the address range is a subset of the total address range of a partition. For example, the controller may select the address range 0 to 99 for each partition in a memory having multiple partitions. When the controller selects the address range, the controller may direct the memory associated with that address range to become temporarily inaccessible. The controller may then use the data stored in the other addresses of the partitions to reconstruct the data stored in the inaccessible memory addresses across the partitions. Further, the controller may restrict the data stored in the other addresses of the partitions from becoming inaccessible while a specific range of addresses across the partitions are inaccessible.

In a further embodiment, the memory element 402 may include multiple memory die. For example, a controller may select a set of memory die from a plurality of memory die, where the number of memory die in the set of memory die is equal to the number of memory die configured for data reconstruction (e.g., an ECC chunk stored across multiple die, or the like). When the controller selects the set of memory die, the controller may direct the set of memory die to become temporarily inaccessible. The controller may then use the data stored in the other memory die from the plurality of memory die in conjunction with the memory die configured for data reconstruction to reconstruct the data on the temporarily inaccessible memory die. Further, the controller may restrict the data stored in the other memory die from becoming inaccessible.

As described above, a controller directs one element 402 to become temporarily inaccessible and ensures that the data from the other elements 402 and the data reconstruction element 404 are available for reconstructing the data on the inaccessible element 402. A controller, such as device controller 126 or on-die controller 220, may manage the background activities of elements 402 and 404 with respect to which elements 402 and 404 are accessible or inaccessible. For example, a controller may send commands directly to the respective elements 402 and the data reconstruction element 404. The controller may send a command directly to an element 402 to become inaccessible. While the element 402 is inaccessible, the controller may send commands directly to the other elements 402 to ensure that they are accessible or instruct the other elements 402 to remain accessible until directed by the controller to become inaccessible. Further, a controller may broadcast clock and frequency settings to the elements 402 and 404. With the clock and frequency settings being sent to the elements 402 and 404, the timing of the elements 402 and 404 may be synchronized. The controller may send commands to the elements 402 and 404 instructing them when to become accessible and inaccessible based on the timing signals received by the elements 402 and 404.

In an alternative embodiment, the elements 402 and 404 may receive clock and frequency settings from a source other than a controller. For example, the elements 402 and 404 may receive clock and frequency settings from a clock located on a printed circuit board (PCB). This PCB broadcast clock may communicate clock and frequency settings with the controller in addition to the elements 402 and 404. The controller and the elements 402 and 404 may use the clock and frequency settings received from the PCB broadcast clock to determine when to be accessible and inaccessible and to limit the elements 402 and 404 such that only one elements can be inaccessible. In a further embodiment, the elements 402 and 404 may have internal clocks and potentially different frequency settings. For example, the separate elements 402 and 404 may be located on separate devices, where each device has an independent clock. When the separate elements 402 and 404 have independent clock and frequency settings, the separate elements 402 and 404 may synchronize their respective clocks at intermittent intervals. The controller may then use the clock and frequency settings for the separate elements 402 and 404 to manage which elements are accessible and inaccessible and to ensure that one elements is inaccessible at a time. In an additional embodiment, the internal clocks of the elements 402 and 404 may not be synchronized or the elements 402 and 404 may not receive the same clock and frequency settings. As such, in certain embodiments, more than one element may become inaccessible at a time. When more than one element is inaccessible and a request for data from one of the inaccessible elements is received, the controller may cause the system to stall such that the system waits to provide the data from an inaccessible element until only one element is inaccessible and the inaccessible data can be reconstructed from the accessible elements 402 and 404. The controller is able to reconstruct data for the inaccessible element by ensuring that the other elements are accessible in this embodiment.

Figure 5:
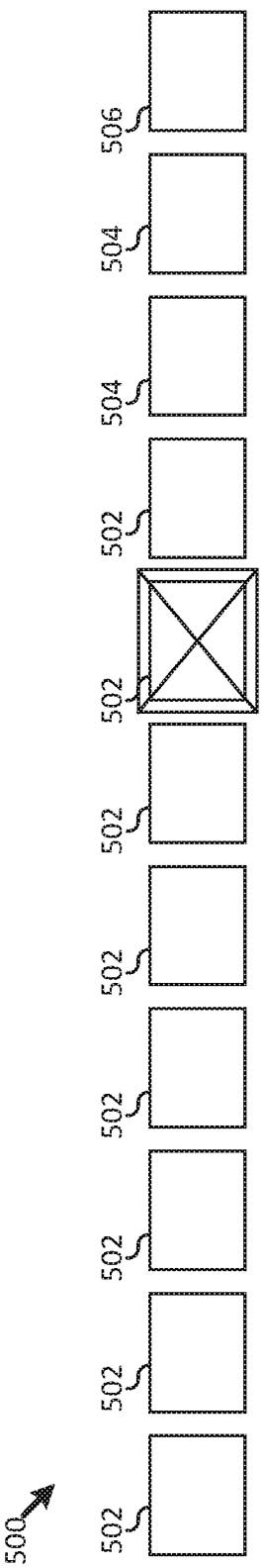
FIG. 5 is a block diagram illustrating another embodiment for reconstructing data for a non-volatile memory element that is temporarily inaccessible.

FIG. 5 illustrates a further embodiment of different memory elements in a memory 500 that are used to reconstruct data for a temporarily inaccessible memory element. In particular, in the depicted embodiment, memory 500 includes data stored on elements 502, error correction elements for error correcting codes stored on error correction elements 504, and data reconstruction information stored on a data reconstruction element 506. As illustrated, an element 502 may become temporarily inaccessible. For example, an element 502 may become temporarily inaccessible for the reasons described above with regards to FIG. 4. In contrast to the memory 400 in FIG. 4, where each element stores associated error correction information, such that the error correction information may be used to correct the bit errors on each element prior to data reconstruction, the accessible data in memory 500 in FIG. 5 is used to reconstruct the data on the inaccessible element prior to performing error correction. For example, when data is requested from an inaccessible element 502, a controller will access the available data on the accessible elements 502, 504, and 506. Using the data stored on the accessible elements 502, 504, and 506, a controller may use the information on the data reconstruction element 506 to reconstruct the data stored on the inaccessible element 502. For example, the data reconstruction element 506 may store XOR information such that the controller may perform an XOR operation to reconstruct the data on the temporarily inaccessible element 502. When the data has been reconstructed for the temporarily inaccessible element 502, the controller may use the error correction information stored on the error correction elements 504 to correct bits that may be in error in the reconstructed data. Further, the controller may also use the error correction information stored on the error correction elements 504 to correct bits that may be in error on the accessible elements 502.

Figure 6:
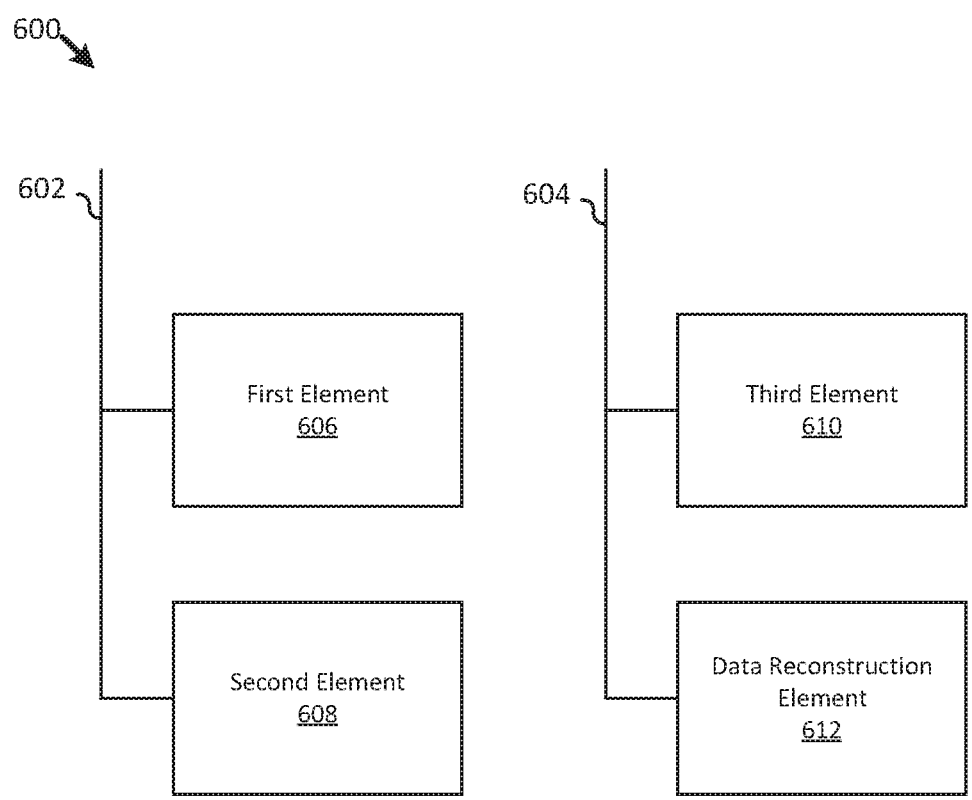
FIG. 6 is a block diagram illustrating a further embodiment for reconstructing data for a non-volatile memory element that is temporarily inaccessible.

FIG. 6 illustrates a further embodiment of different memory elements in a memory 600 that are used to reconstruct data for a temporarily inaccessible element, where the different memory elements are arranged on different channels. As used herein, the channel refers to a section of memory that may be accessed in parallel with another section of memory. As data to be reconstructed may be located on a single channel, the data stored in other portions of memory located on different channels may be used to reconstruct the data that is inaccessible. For example, the memory 600 has a first channel 602 and a second channel 604. As illustrated, the first channel 602 and a second channel 604 each have 2 separate memory elements associated therewith. While memory 600 has the same number of memory elements on both the first channel 602 and the second channel 604, the first channel 602 and the second channel 604 may have different numbers of segments associated therewith. Further, one channel in the first channel 602 and the second channel 604 may have a memory element associated therewith that may store parity data. For example, the first channel 602 may have a first element 606 and a second element 608, where both the first element 606 and the second element 608 may store user data. In contrast to the first channel 602, the second channel 604 may have a third element 610 and a data reconstruction element 612. The data reconstruction element 612 stores information that can be combined with data stored on the first element 606, the second element 608, and third element 610 to reconstruct data on an element.

In certain embodiments, an element of data on one of the channels may become temporarily inaccessible. For example, the third element 610 may become temporarily inaccessible to refresh the data stored thereon or for other reasons described above in relation to FIG. 2. When an element becomes temporarily inaccessible, information stored on the elements associated with multiple channels may be combined with the data on the data reconstruction element 612 and the accessible elements to instruct the data on the temporarily inaccessible element. As the third element 610 is temporarily inaccessible, the information on the data reconstruction element 612 may be combined with the data on the first element 606 and a second element 608 to reconstruct the inaccessible data on the third element 610. For example, a controller may perform a XOR of the data on the data reconstruction element 612 with the data on the first element 606 and the second element 608.

In at least one embodiment, as the elements are on different channels, the different elements may be combined in a particular order to reconstruct the data on the third element 612. For example, a controller may read the data from the first element 606, the second element 608, and a data reconstruction element 612. The controller may then combine the data on the first element 606 with the data on the data reconstruction element 612. When the data from the first element 606 and the data from the data reconstruction element 612 are combined, the controller may use an error correcting code to correct bit errors on the first element 606 and the data reconstruction element 612. When the bit errors are corrected for the combined data from the first element 606 and the data reconstruction element 612, the controller may execute an error correcting code to correct bit errors on the second element 608. When the bit errors are corrected for the second element 608, the controller may combine the data on the second element 608 with the combined data from the first element 606 the data reconstruction segment 612 to reconstruct the data on the third element 610.

Figure 7:
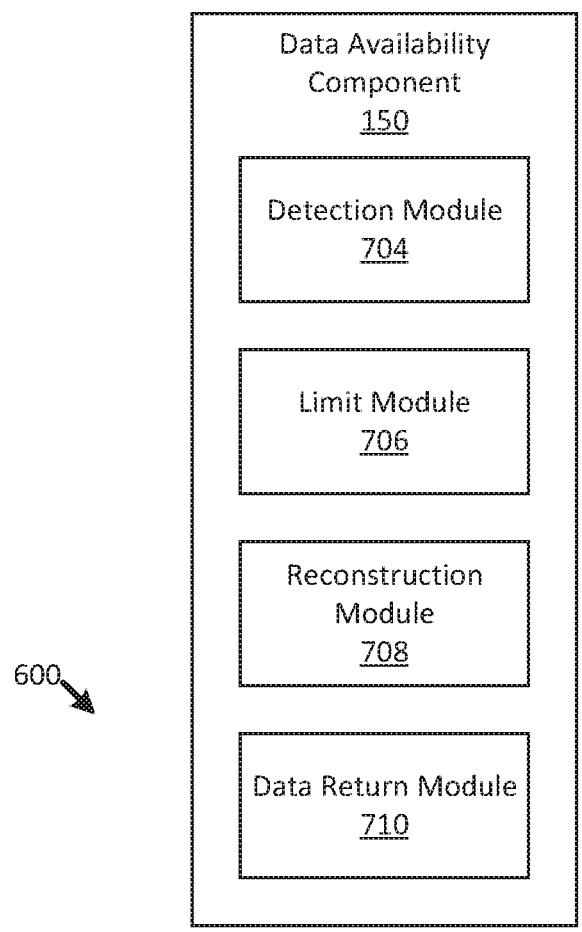
FIG. 7 is a schematic block diagram illustrating one embodiment of a data availability component.

FIG. 7 depicts one embodiment, of a data availability component 150. The data availability component 150 may be substantially similar to the data availability component 150 described above with regard to FIGS. 1-6. In general, as described above, the data availability component 150 may be configured to reconstruct data for a temporarily inaccessible memory element using data from accessible memory elements. In the depicted embodiment, the data availability component 150 includes a detection module 704, a limit module 706, a reconstruction module 708, and a data return module 710. In various embodiments, a controller, such as an on-die controller 220 for a single non-volatile memory element 123, a device controller 126 for a device comprising one or more non-volatile memory elements 123, a device driver comprising executable code stored on a computer-readable storage medium, or the like, may include the detection module 704, the limit module 706, the reconstruction module 708, and the data return module 710.

The detection module 704, in one embodiment, is configured to respond to a read request for a plurality of non-volatile memory elements by detecting that a portion of memory of the plurality of non-volatile memory elements is temporarily inaccessible. A controller may attempt to access data stored on an element in the plurality of non-volatile memory elements. For example, the controller may either attempt to read data stored on the elements or write data to the element. The detection module 704, upon attempting to access data stored on the element, may determine whether or not the data is accessible for either writing data to the element or reading data from the element. In certain embodiments, detection module 704 determines whether an attempt to access data is for reading or writing the data. When the controller receives a read request for a portion of memory that is inaccessible, the controller may attempt to reconstruct the data and provide the reconstructed data to a computing system such as a host device. When the memory is being written to, the controller may handle the write operation as described below with regard to write module 812 and FIGS. 11A-11C.

In certain embodiments, a portion of memory may become inaccessible to perform a temporary background activity. For example, a memory element may be periodically refreshed to maintain the data stored in the memory. Alternatively, other background activities may also be performed that cause the portion of memory to become temporarily inaccessible. For example, a background activity, as described above, may include a program, a read, an erase, a chip reset, a settings access, or other activity that may cause a memory element to become temporarily inaccessible.

In certain embodiments, where each element is a separate die, detection module 704 may detect that the individual die is temporarily inaccessible. In a further embodiment, an element includes multiple die on a channel. When an element includes multiple die on a channel, the detection module 704 may detect that the multiple die on the channel are temporarily inaccessible. In an alternative embodiment, where an element includes a subgroup of die, where the die in the subgroup are associated with separate channels. For example, die within a channel may be numbered for identification purposes and the detection module 704 may identify the subgroup of die as including the die on the separate channels that have the same identification number. Further, the controller may direct die on separate channels having the same enumeration to become temporarily inaccessible (e.g., in parallel in the separate channels or the like).

In a further embodiment, a memory element may include a package of die in a memory array having multiple packages. A controller may direct the die in a package to become temporarily inaccessible at the same time. In at least one embodiment, a memory element may include two or more die and/or die planes containing multiple memory cells. A controller may cause the die or die plane of memory cells to become temporarily inaccessible. In another embodiment, an element may include a partition in the memory array having multiple partitions. A controller may cause the partition to become temporarily inaccessible. In another embodiment, an element may include a portion of memory within memory stored on a die. A controller may select a portion of memory stored on a die, where the portion of memory is smaller than the total memory stored on the die. Additionally, a memory element may include a grouped sub-range of addresses across different partitions in a portion of the memory. A controller may select an address range of memory stored for a partition, where the address range is a subset of the total address range of a partition. For example, the controller may select the address range 0 to 99 for each partition in a memory having multiple partitions. When the controller selects the address range, the controller may direct the memory associated with that address range in each partition to become temporarily inaccessible.

The limit module 706, in one embodiment, is configured to temporarily limit other portions of memory of the plurality of non-volatile memory elements from becoming inaccessible. For example, when the detection module 704 detects that an element in the memory array is inaccessible, the limit module 706 may restrict data stored in other elements in the memory array from becoming inaccessible. As used herein, data stored in an element is accessible when a host device or other computing device is able to access the data stored in the element. Conversely, data stored in an element is inaccessible when a host device or other computing device is unable to access the data stored in the element. Thus, when the limit module 706 limits other portions of memory from becoming inaccessible, the limit module 706 limits background media activities or other controllable operations from being performed on the data stored in the other portions of memory, where the background activities or other controllable operations would cause the data to become inaccessible.

As described above, an element may correspond to multiple different arrangements of memory that may become accessible or inaccessible. In certain embodiments, where an inaccessible element is a single die in the memory, the limit module 706 may limit data stored in other die in the memory from becoming inaccessible. In another embodiment, where an inaccessible element is a channel associated with multiple die, the limit module 706 may limit other channels containing multiple die from becoming inaccessible. In a further embodiment, where a particular enumeration of die in a partition is inaccessible, the limit module 706 may limit die having an even enumeration different from the particular enumeration of die from becoming inaccessible. Also, when a plane is inaccessible, the limit module 706 may limit other planes in the memory from becoming inaccessible. Further, when an address range within a portion of memory is inaccessible, the limit module 706 may limit other addresses outside the inaccessible address range from becoming inaccessible.

In at least one embodiment, the limit module 706 may limit a portion of memory from becoming inaccessible by directly controlling the accessibility of a memory element such that an accessible element is limited from becoming inaccessible when another element is inaccessible. For example, the limit module 706 may send commands directly to the elements in the memory that instruct them to begin background activities that would cause them to be inaccessible and send commands to stop the background activities and become accessible. In an alternative example, the limit module 706 may broadcast clock and frequency settings to the elements in the memory. Also, the limit module 706 may direct the elements to use the broadcast clock and frequency settings to ensure that only one element is inaccessible.

In a further embodiment, the elements may receive clock and frequency settings from a source other than the limit module 706 such as a PCB clock. For example, to limit whether an element is inaccessible, limit module 706 may direct the elements to use the PCB clock signal and frequency settings to ensure that only one element is inaccessible. Also, the separate elements may have internal clocks and potentially different frequency settings, where the separate elements synchronize their respective clocks at intermittent intervals. The limit module 706 may direct the elements to use the synchronized clocks signals and frequency settings to ensure that only one element is inaccessible. In certain embodiments, the operation of the elements may be unsynchronized, and the elements may not receive the same clock and frequency settings. As such, when the timing of the operation of the elements is sufficiently independent from one another, more than one element may become inaccessible at a time. When more than one element is inaccessible and a request for data from one of the inaccessible elements is received, the limit module 706 may cause the system to stall such that the system waits to provide the data from an inaccessible element until only one element is inaccessible. Further, in certain embodiments, the limit module 706 may verify that only one element is inaccessible. For example, limit module 706 may verify that elements other than the inaccessible elements have not failed or died while the data stored on the inaccessible element is unavailable. If the limit module 706 determines that an element has died or failed, the limit module 706 will cause the system to wait for the failed element to become available. The limit module 706 ensures that only one element is inaccessible such that data can be reconstructed from the data available on the accessible elements The reconstruction module 708, in one embodiment, is configured to reconstruct data for an inaccessible element using data stored on the accessible elements. The reconstruction module 708 may combine the data on the accessible elements with the data reconstruction element to construct a representation of the data on the inaccessible element. For example, a data reconstruction element may store an XOR of the data stored on the inaccessible element in combination with the data stored on the accessible elements. By combining the data stored on the data reconstruction element with the data stored on the accessible elements, the reconstruction module 708 may reconstruct the data stored on the inaccessible element. The reconstruction module 708 may store data on the data reconstruction element using an operation that allows the reconstruction of data for an element in the event that an element is inaccessible.

In certain embodiments, where the element is a die and a die is inaccessible, the reconstruction module 708 may combine the data stored on the accessible die with data stored on a data reconstruction die to reconstruct the data stored on the inaccessible die. Further, where the element is a channel from multiple channels and the channel is accessible, the reconstruction module 708 may combine the data stored on an accessible channels with a channel that stores data reconstruction information to reconstruct the data stored on the inaccessible channel. Similarly, the reconstruction module 708 may reconstruct the data stored on an inaccessible element, when the elements is a plane, a partition, package, an address range, or the like.

The data return module 710, in one embodiment, is configured to provide the reconstructed data to a host or a computing system. For example, the data return module 710 may, in response to a read request or other memory operation, provide reconstructed data to a host or other computing system. In certain embodiments, when the data for the inaccessible element is reconstructed, the data return module 710 outputs the reconstructed data on a bus. For example, the data return module 710 may output reconstructed data for a specific address on a temporarily inaccessible element. When the data return module 710 has acquired data from the specific address, the data return module 710 may then provide the acquire data to a host connected to the memory element.

Figure 8:
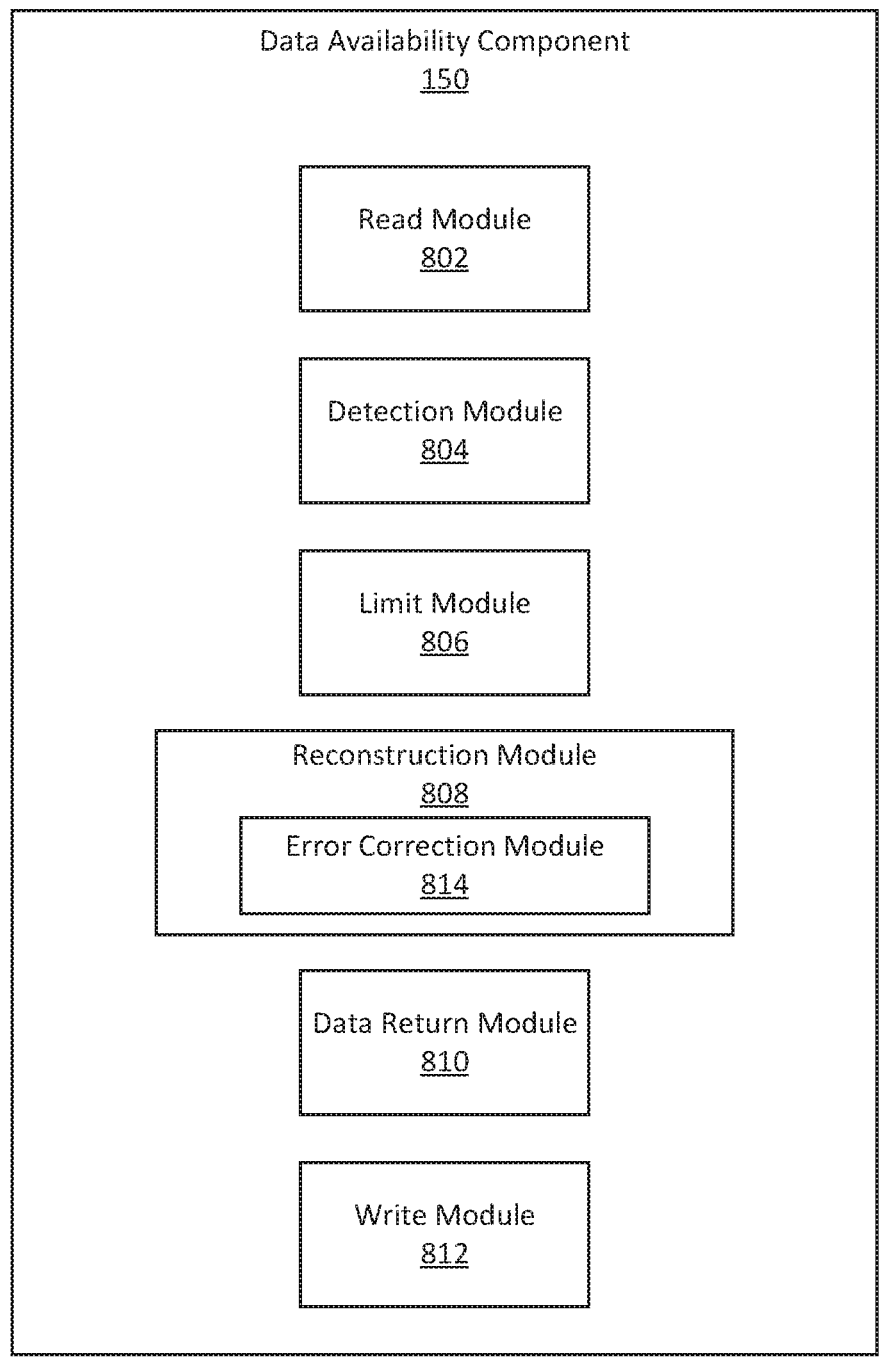
FIG. 8 is a schematic block diagram illustrating another embodiment of a data availability component.

FIG. 8 depicts another embodiment of a data availability component 150. The data availability component 150, in various embodiments, may be substantially similar to the data availability component 150 described above with regard to FIGS. 1-7. In the depicted embodiment, the data availability component 150 includes a detection module 804, a limit module 806, a reconstruction module 808, and a data return module 810, which may be configured substantially as described above with regard to FIG. 7. The data availability component 150, in the depicted embodiment, further includes a read module 802 and a write module 812. The reconstruction module 808, in the depicted embodiment, further includes an error correction module 814.

The read module 802, in one embodiment, is configured to read data from a portion of an element in a memory array. For example, a host device, such as a computing system, may request data from a portion of an element in the memory array. Further, the read module may associate a particular physical characteristic of a cell on the element with a particular data state. For example, when the element is an element in a phase change memory (PCM) cell, where the resistivity of the cell is associated with a particular physical state of the cell, the read module 802 may identify the data state associated with a particular physical state of the cell. When the read module 802 identifies the data state of a cell, the read module 802 may provide the read data state to the data return module 810, where the data return module 810 provides the read data to the host device. In certain embodiments, the read module 802 may be unable to read data from a portion of an element because the element is inaccessible. As such, the detection module 804 may detect whether or not an element is accessible before the read module 802 attempts to read data from the element.

The error correction module 814, in one embodiment, is configured to correct bit errors in an element or multiple elements in a memory array. The error correction module 814 may use data stored in multiple elements of a memory array to correct errors in the associated memory elements. The error correction module 814 may execute an error correcting code to correct bit errors stored on the multiple elements of the memory array. As described above, an error correcting code may be one of various types of error correcting codes, such as a block code, a convolution code, a Bose-Chaudhuri-Hocquenghem (BCH) code, a low-density parity check (LDPC) code, a Hamming code, a Reed-Solomon code, a turbo code, or the like. In a certain embodiment, the error correcting code may be a systematic error correcting code, so that each ECC chunk, or code word, may store data received by an encoder for the error correcting code, as well as parity bits, or check bits. In certain embodiments, a portion of each element may store parity bits that may be used by the error correction module 814 when executing an error correcting code to correct bit errors in the associated element. When a portion of each element stores parity bits, the error correction module 814 may correct errors in the accessible elements before the reconstruction module 708 reconstructs the data for the inaccessible element. Alternatively, certain embodiments may include one or more elements that may store parity bits for the other elements in a plurality of elements. When one or more elements store parity data, the error correction module 814 may correct errors in the accessible elements after the reconstruction module 708 has reconstructed the data for the inaccessible element. In certain embodiments, one or more elements may store parity data and one or more elements may have a portion for storing parity data and a portion for storing user information.

The write module 812, in one embodiment, is configured to write data into an element in a memory array. In particular, the write module 812 may be configured to write data into an element in the memory array that is temporarily inaccessible. In contrast, when an element in the memory array is accessible, the write module 812 may write data into an element in the memory array as known by one having skill in the art. However, when an element is inaccessible, the write module 812 may include certain functionality to ensure that the data is written to the inaccessible element.

In at least one embodiment, the write module 812 may force an inaccessible element to become accessible. For example, when an element is inaccessible because of a background media activity, the write module 812 may pause the background media activity to write data onto the element. When the background media is paused, the write module 812 may verify that the previously inaccessible element is now accessible. When the element becomes accessible, the write module 812 may write the data to the element. In an alternative embodiment, the write module 812 may determine whether a write request is associated with an element of memory that is inaccessible. When the write request is associated with an inaccessible element, the write module 812 may save the write request to a buffer. When the inaccessible element becomes accessible, the write module 812 may then write the data saved in the buffer to the inaccessible element. For example, when an inaccessible element becomes accessible, the write module 812 may check a buffer for write requests that occurred while the element was inaccessible. Alternatively, when a write request exists in the buffer, the write module 812 may periodically check whether the element associated with the write request is accessible. When write module 812 discovers that the element is accessible, the write module 812 may then perform the write requests that are saved in the buffer. In a further embodiment, the write module 812 may limit the performance of background activities such that background activities are performed when there is a low amount of write requests. For example, the write module 812 may establish a threshold value for write requests over a period of time. If the number of write requests received over a period of time is greater than the threshold value, then the write module 812 may limit the performance of background activities. In contrast, if the number of write requests received over a period of time is less than the threshold value, then the write module 812 may allow the performance of background activities. In a further embodiment, write module 812 may suspend the performance of background activities while writes are in progress.

Figure 9:
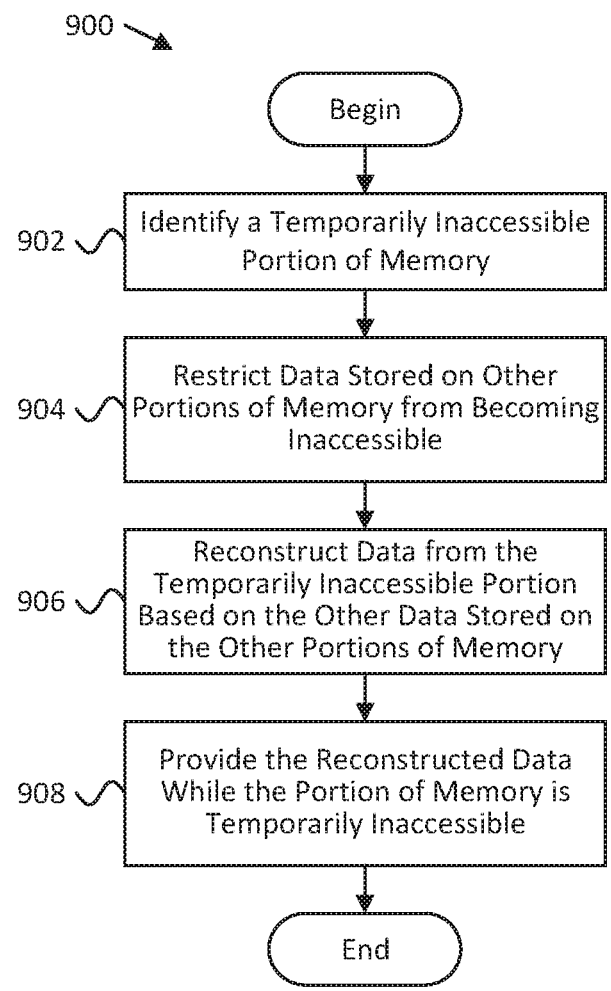
FIG. 9 is a schematic flow chart diagram illustrating one embodiment of a method for data availability during temporary inaccessibility of a memory region for non-volatile memory.

FIG. 9 depicts one embodiment of a method 900 for data availability during temporary inaccessibility of a memory region. The method 900 begins, and the detection module 704 identifies 902 a temporarily inaccessible portion of memory. The limit module 706 restricts 904 data stored in other portions of memory from becoming inaccessible. The reconstruction module 708 reconstructs 906 data from the temporarily inaccessible portion based on the data stored in the other portions of memory. The data return module 710 provides 908 the reconstructed data while the portion of memory is temporarily inaccessible, and the method 900 ends.

Figure 10:
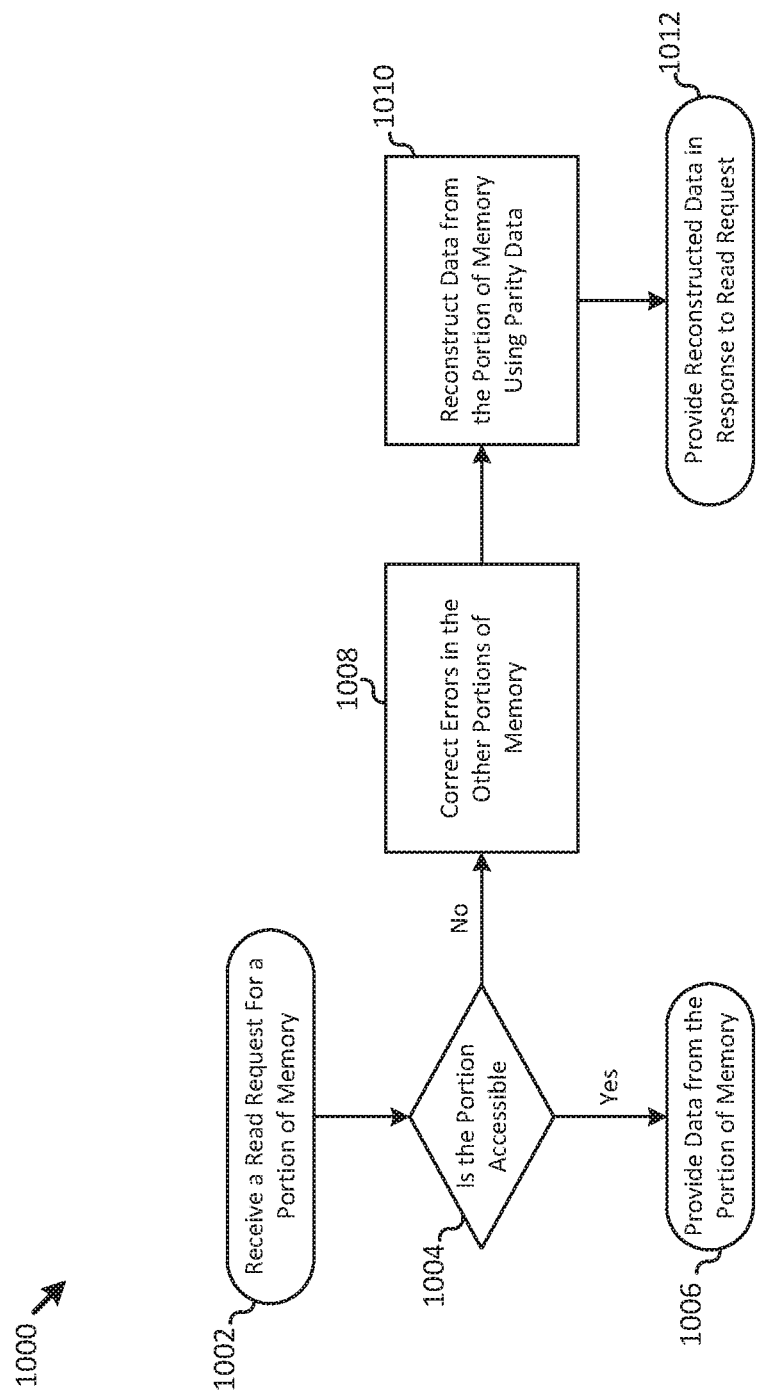
FIG. 10 is a schematic flow chart diagram illustrating another embodiment of a method for data availability during temporary inaccessibility of a memory region for non-volatile memory.

FIG. 10 depicts another embodiment of a method 1000 for data availability during temporary inaccessibility of a memory region. Method 1000 begins, and the read module 802 receives 1002 a read request for a portion of memory. The detection module 704 determines 1004 whether a portion of memory is accessible. If the portion of the memory is accessible, the data return module 710 provides 1006 data from the portion of memory. If the detection module 704 determines that the portion of memory is not accessible, the error correction module 814 corrects 1008 errors in the other portions of memory. The reconstruction module 708 reconstructs 1010 data from the portion of memory using the parity data. The data return module 710 provides 1012 reconstructed data in response to the read request.

Figure 11A:
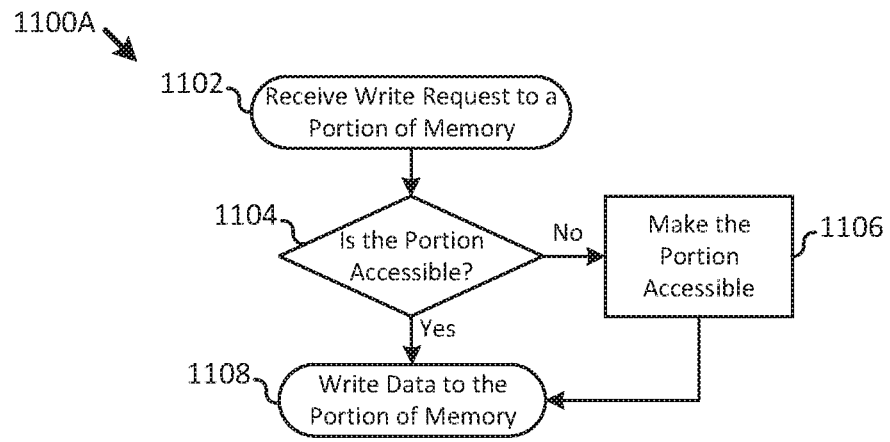
FIGS. 11A-11C are schematic flow chart diagrams illustrating the handling of write requests during temporary inaccessibility of a memory region.

FIG. 11A depicts another embodiment of a method 1100A for data availability during temporary inaccessibility of a memory region. In particular, method 1100A depicts one embodiment for handling a write request. Method 1100A begins, and the write module 812 receives 1102 a write request to a portion of memory. The detection module 704 determines 1104 whether the portion of memory is accessible. If the portion of the memory is accessible, the write module 812 writes 1108 the data to the portion of memory. In contrast, if the portion of the memory is inaccessible, the write module 812 makes 1106 portion accessible. For example, the write module 812 may interrupt or suspend a background media activity that is causing the portion of memory to be in accessible. When the portion of memory is accessible, the write module 812 writes 1108 the data to the portion of memory.

Figure 11B:
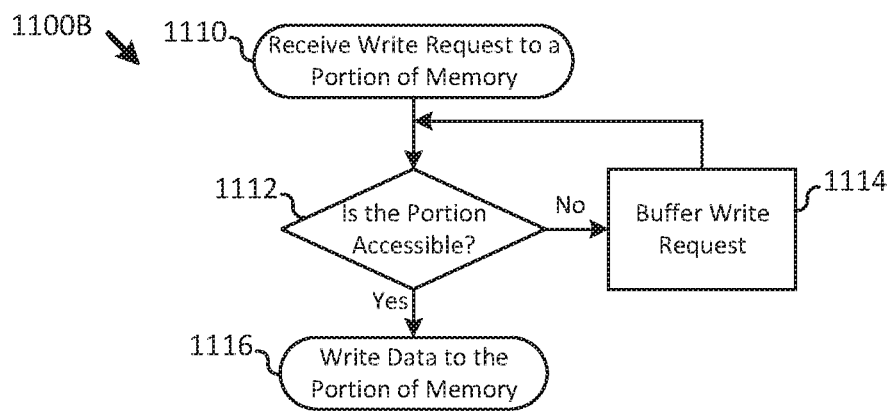

FIG. 11B depicts another embodiment of a method 1100B for data availability during temporary inaccessibility of a memory region. In particular, method 1100B depicts an additional embodiment for handling a write request. Method 1100B begins, and the write module 812 receives 1110 a write request to a portion of memory. The detection module 704 determines 1112 whether the portion of memory is accessible. If the portion of the memory is accessible, the write module 812 writes 1116 the data to the portion of memory. In contrast, if the portion of the memory is inaccessible, the write module 812 buffers 1114 the write request. After buffering the write request, the detection module 704 again determines 1112 whether the portion of memory is accessible. When the portion of memory becomes accessible, the write module 812 writes 1116 the data to the portion of memory.

Figure 11C:
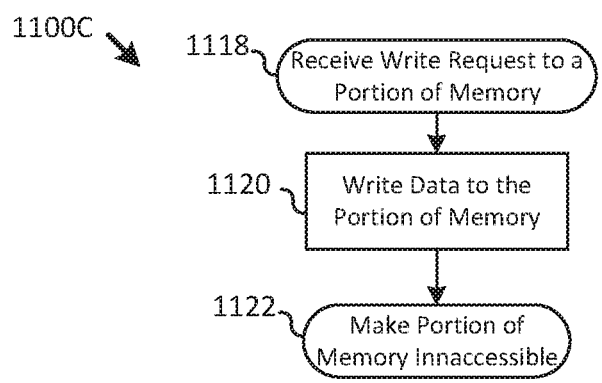

FIG. 11C depicts another embodiment of a method 1100C for data availability during temporary inaccessibility of a memory region. In particular, method 1100C depicts an additional embodiment, for handling a write request. Method 1100C begins, and the write module 812 receives 1118 a write request to a portion of memory. The write module 812 writes 1120 data to the portion of memory. After writing the data to the portion of memory, the write module 812 makes 1122 portion of memory in accessible. For example, the write module 812 limits a background activity from occurring until after the write request has completed. When the write request completes, the write module 812 allows the background activity to proceed.

In various embodiments, a means for detecting, in response to a read request for a plurality of non-volatile memory elements, that a portion of memory of the plurality of non-volatile memory elements is temporarily inaccessible may include a read module 802, a detection module 704, a data availability component 150, a state machine 222, an on-die controller 220, a device controller 126, a device driver, other logic hardware and/or other executable code stored on a computer readable storage medium. Other embodiments may include similar or equivalent means for detecting that a portion of memory is temporarily inaccessible.

In various embodiments, a means for temporarily limiting other portions of memory of a plurality of non-volatile memory elements from becoming inaccessible may include a limit module 706, a data availability component 150, a state machine 222, an on-die controller 220, a device controller 126, a device driver, other logic hardware and/or other executable code stored on a computer readable storage medium. Other embodiments may include similar or equivalent means for limiting other portions of memory from becoming inaccessible.

In various embodiments, a means for reconstructing temporarily inaccessible data of a portion of memory by correcting errors in other portions of memory and reconstructing temporarily inaccessible data from accessible data stored in the other portions of memory may include a reconstruction module 708, a data reconstruction element 304, an error correction module 814, a data availability component 150, a state machine 222, an on-die controller 220, a device controller 126, a device driver, other logic hardware and/or other executable code stored on a computer readable storage medium. Other embodiments may include similar or equivalent means for reconstructing temporarily inaccessible data.

In various embodiments, a means for providing reconstructed temporarily inaccessible data in response to a read request may include a data return module 710, a data availability component 150, a state machine 222, an on-die controller 220, a device controller 126, a device driver, other logic hardware and/or other executable code stored on a computer readable storage medium. Other embodiments may include similar or equivalent means for providing the reconstructed temporarily inaccessible data.

In various embodiments, a means for handling write requests to a portion of memory may include a write module 812, a data availability component 150, a state machine 222, an on-die controller 220, a device controller 126, a device driver, other logic hardware and/or other executable code stored on a computer readable storage medium. Other embodiments may include similar or equivalent means for handling write requests to a portion of memory.

In various embodiments, a means for detecting and/or correcting errors in the plurality of non-volatile memory elements may include an error correction module 814 (e.g., for error detection and/or correction), a data availability component 150, a state machine 222, an on-die controller 220, a device controller 126, a device driver, or other logic hardware and/or other executable code stored on a computer readable storage medium. Other embodiments may include similar or equivalent means for correcting errors in a plurality of non-volatile memory elements.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. An apparatus comprising:
    a plurality of memory elements; and
    a controller configured to:
        initiate a refresh activity for a first portion of memory of the plurality of memory elements, wherein the refresh activity for the first portion of memory comprises refreshing data of the first portion of memory by re-writing the data to the first portion of memory;
        prevent refresh activity for a second portion of memory and a data reconstruction portion of memory during the refresh activity for the first portion of memory, wherein the second portion of memory stores data other than the data of the first portion of memory, and the data reconstruction portion stores parity data usable with the data stored in the second portion of memory to reconstruct the data stored in the first portion of memory;
        in response to a read request received during the refresh activity for the first portion of memory, reconstruct the data stored in the first portion of memory from the parity data and the data stored in the second portion of memory; and
        provide the reconstructed data.

2. The apparatus of claim 1, wherein the first portion of memory comprises a memory element of the plurality of memory elements.

3. The apparatus of claim 1, wherein error correction information is distributed among the plurality of memory elements, and the controller uses the error correction information to correct memory of individual elements in the plurality of memory elements before reconstructing the data stored in the first portion of memory.

4. The apparatus of claim 1, wherein error correction information is stored in one or more elements in the plurality of memory elements separate from elements storing user data in the plurality of memory elements, and the controller uses the error correction information to correct the data of the first portion of memory after reconstructing the data stored in the first portion of memory.

5. The apparatus of claim 1, wherein the controller pauses the refresh activity for the first portion of memory in response to a write request to the first portion of memory.

6. The apparatus of claim 1, wherein the controller buffers write requests to the first portion of memory and applies the write requests after completion of the refresh activity for the first portion of memory.

7. The apparatus of claim 1, wherein the controller waits for received writes to finish before initiating the refresh activity for the first portion of memory.

8. A method comprising:
    initiating a refresh activity for a first portion of memory of a plurality of memory elements, wherein the refresh activity for the first portion of memory comprises refreshing data of the first portion of memory by re-writing the data to the first portion of memory;
    preventing refresh activity for a second portion of memory and a data reconstruction portion of memory during the refresh activity for the first portion of memory, wherein the second portion of memory stores data other than the data of the first portion of memory, and the data reconstruction portion stores parity data usable with the data stored in the second portion of memory to reconstruct data stored in the first portion of memory;
    in response to a read request received during the refresh activity for the first portion of memory, reconstructing data from the first portion of memory based on the parity data and the data stored in the second portion of memory; and
    providing the reconstructed data.

9. The method of claim 8, wherein reconstructing the data from the first portion of memory comprises:
    using error correction information to correct memory of the second portion of memory; and
    reconstructing the data on the first portion of memory using the parity data and the data stored in the second portion of memory.

10. The method of claim 9, further comprising using the error correction information to correct the reconstructed data after reconstructing the data on the first portion of memory.

11. The method of claim 8, further comprising:
    receiving a write request to the first portion of memory;
    pausing the refresh activity for the first portion of memory; and
    writing to the first portion of memory.

12. The method of claim 8, further comprising:
    receiving a write request to the first portion of memory;
    buffering the write request; and
    applying the write request after completion of the refresh activity for the first portion of memory.

13. An apparatus comprising:
    means for initiating a refresh activity for a first portion of memory of a plurality of memory elements, wherein the refresh activity for the first portion of memory comprises refreshing data of the first portion of memory by re-writing the data to the first portion of memory;
    means for preventing refresh activity a second portion of memory and a data reconstruction portion of memory during the refresh activity for the first portion of memory, wherein the second portion of memory stores data other than the data of the first portion of memory, and the data reconstruction portion stores parity data usable with the data stored in the second portion of memory to reconstruct data stored in the first portion of memory;
    means for reconstructing data of the first portion of memory in response to a read request received during the refresh activity for the first portion of memory, by correcting errors in the second portion of memory and reconstructing the data of the first portion of memory based on the parity data and the data stored in the second portion of memory; and means for providing the reconstructed data in response to the read request.

14. The apparatus of claim 13, further comprising means for handling write requests to the first portion of memory.

15. The apparatus of claim 14, wherein the means for handling write requests to the first portion of memory pauses the refresh activity for the first portion of memory while writing to the first portion of memory.

16. The apparatus of claim 13, further comprising means for correcting errors in the plurality of memory elements.

* * * * *